S. USTICK.
Improvement in Lubricators for Car-Axle Boxes.

No. 126,351. Patented April 30, 1872.

Witnesses
Thomas J. Bewley
Isaac Pinckney

Inventor.
Stephen Ustick 126,351

UNITED STATES PATENT OFFICE.

STEPHEN USTICK, OF PHILADELPHIA, PENNSYLVANIA.

IMPROVEMENT IN LUBRICATORS FOR CAR-AXLE BOXES.

Specification forming part of Letters Patent No. 126,351, dated April 30, 1872.

Specification describing certain Improvements in Lubricators for Car-Journals, invented by STEPHEN USTICK, of the city of Philadelphia and State of Pennsylvania.

My invention is an improvement on the one for which Letters Patent were issued to me on the 5th day of December, 1871, and consists of the following particulars: Instead of using longitudinal bars or other supports for holding up fibrous pads against the journal and bearing for the distribution of oil upon the same, and to act as wipers for the oil, to prevent its escape from the bearing as the journal revolves, I construct the bearing with vertical recesses in its lower side, in either a vertical or inclined position, with which I combine the pads. The recesses are sufficiently large to allow the pads to descend by means of their own weight as their lower edges wear away, so as to always maintain their contact with the journal. When the bearing is not wide enough to form the groove outside of the journal, I form rabbets in its edges, which, with the sides of the car-box form the spaces to receive the pads. The upper side of the bearing has a longitudinal groove, in which one end of the wick for conducting the oil is laid, and communicates with pads in cross-grooves near the ends of the bearing, the ends of which connect with the pads in the longitudinal recesses in its under side. The wick hangs over the front end of the bearing, its lower end lying in oil in the journal-box or other oil-reservoir. There are also longitudinal grooves in the upper side of the bearing vertical with the recesses in its lower side, which are provided with pads, the ends of which connect with the cross-pads, so as to form a continuous pad around the journal near its edge, for the circuit of the oil. There are perforations through the metal from all the grooves for the passage of oil to the longitudinal pads in the recesses in its under side, and to the face of the bearing between the same, so as to distribute the oil thoroughly. In consequence of the connection of the distributing pads in the lower side of the journal by means of the cross-pads, the oil passes freely from one to the other of said distributing-pads, to make up for any deficiency in either. The upper side of the bearing has a number of recesses which communicate with its wearing-surface, which are filled with fibrous or porous material to absorb any excess of oil and redistribute it upon the journal when a deficiency arises.

Figure 1:
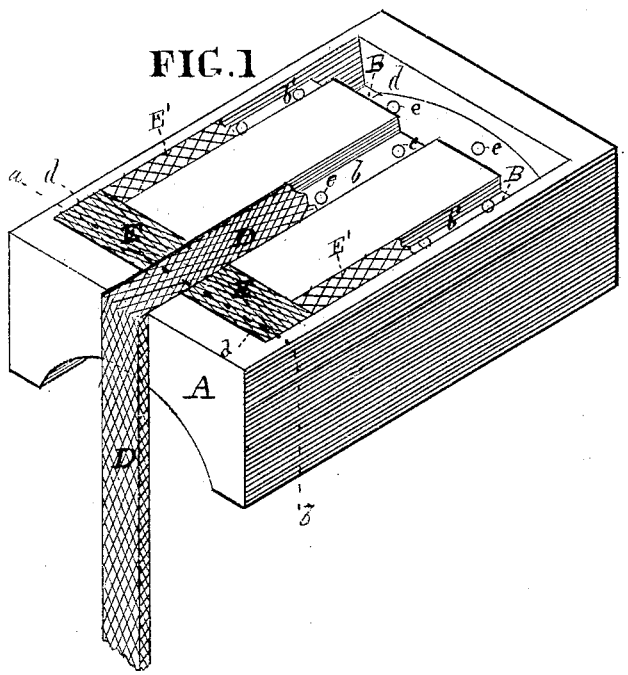
Figure 2:
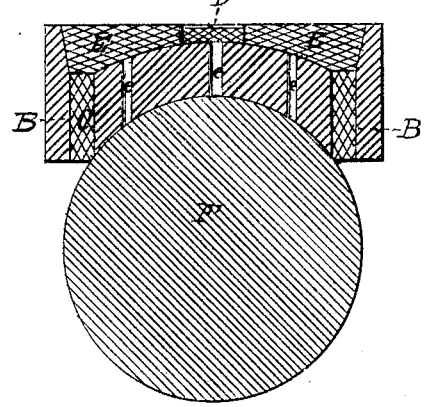
Figure 3:
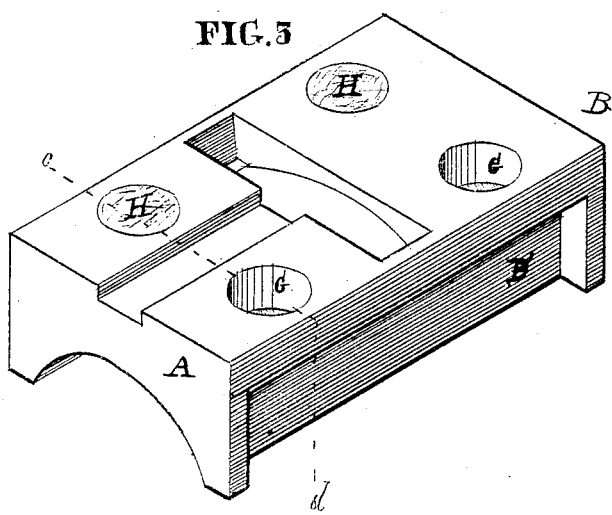
Figure 4:
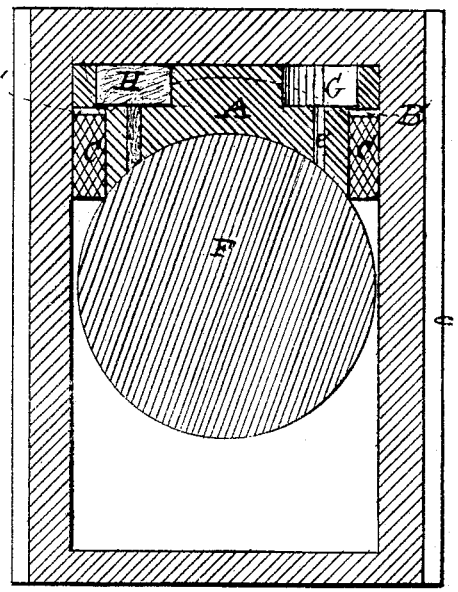

Figure 1 is an isometrical view of the improved bearing A. Fig. 2 is a cross-section at the line $a\ b$ of Fig. 1. Fig. 3 is an isometrical view of a bearing adapted to narrow journal-boxes. Fig. 4 is a cross-section at the line $c\ d$ of Fig. 3.

Like letters in all the figures indicate the same parts.

A is the bearing, in the under side of which are recesses B B, which are provided with pads C C, of fibrous or porous material, the lower edges of which touch the journal. The oil is conducted from the bottom of the journal-box or other oil-reservoir, by means of the wick D, the upper end of which is passed over the front end of the bearing A, and laid in the longitudinal groove $b$, and connects with the pads E E in the cross-grooves $d\ d$. The ends of these grooves connect with the vertical recesses B B, for the purpose of connecting the ends of the pads E E with the distributing-pads C C, so that the oil may pass from the wick through the former pads to the latter, and be distributed by them upon the journal. The pads E E also serve to pass the oil from one of the pads C to the other, so as to maintain an equal saturation between the two pads. There are longitudinal grooves $b'\ b'$, which are provided with pads E' E' that connect with the cross-pads E E to form a circuit for the flow of oil and a complete distribution of the same. There are perforations $e$ through the metal from the grooves $b$, $d\ d$, and $b'\ b'$, for the passage of oil from the wick and pads to the face of the bearing and to the distributing-pads C C to aid in the distribution of the oil upon the journal. When the journal-box is too narrow to admit of the recesses B B being made in the bearing, as represented in Figs. 1 and 2, they may be formed in the edges of the bearing, as shown in Figs. 3 and 4, which, with the sides of the journal-box form proper recesses for the pads C C, as seen in Fig. 4. By this arrangement the box is only required to be wide enough to receive the journal F. There are recesses G in the upper side of the bearing, and small perforations $e'$ leading therefrom to the wearing-surface of the bearing, which are filled with fibrous material H, seen in Figs. 3 and 4, to take up the excess of oil from the journal and distribute it upon the same when needed. If desired, the wick D may be combined with the bearing, as described, without the use of any or all of the pads C, C, E, and E'.

I claim as my invention—

1. The longitudinal grooves or recesses B B and the combination therewith of the distributing-pads C C, substantially in the manner and for the purpose above described.

2. The combination of the wick D with the longitudinal groove $b$ in the top of the bearing A for lubricating the journal, substantially in the manner described.

3. The combination of the pads E E with the recesses $d\ d$ and the pads C C, substantially and for the purposes set forth.

4. The combination of the pads E' E' with the grooves $b'\ b'$, the pads E E, and C C, substantially as described, and for the purpose specified.

5. The recesses G, having perforations $e'$, both filled with fibrous or porous material, in combination with the distributing-pads C and the face of the journal, substantially in the manner and for the purpose set forth.

STEPHEN USTICK.

Witnesses:
THOMAS J. BEWLEY,
J. W. HAMPTON, Jr.